US011191038B2

(12) United States Patent
Park (10) Patent No.: US 11,191,038 B2
(45) Date of Patent: Nov. 30, 2021

(54) DETERMINING WIDEBAND TRANSMISSION POWER BASED ON INTERFERENCE AND PREAMBLE DETECTION LEVELS FOR AN OVERLAPPING BASIC SERVICE SET

(71) Applicant: Intel Corporation, Santa Clara, CA (US)

(72) Inventor: Minyoung Park, San Ramon, CA (US)

(73) Assignee: Intel Corporation, Santa Clara, CA (US)

(*) Notice: Subject to any disclaimer, the term of this patent is extended or adjusted under 35 U.S.C. 154(b) by 8 days.

(21) Appl. No.: 16/727,721

(22) Filed: Dec. 26, 2019

(65) Prior Publication Data

US 2020/0145930 A1  May 7, 2020

(51) Int. Cl.
*H04W 52/24* (2009.01)
*H04W 76/14* (2018.01)
*H04B 17/336* (2015.01)
*H04B 17/318* (2015.01)
*H04W 84/12* (2009.01)

(52) U.S. Cl.
CPC ........ *H04W 52/242* (2013.01); *H04B 17/318* (2015.01); *H04B 17/336* (2015.01); *H04W 76/14* (2018.02); *H04W 84/12* (2013.01)

(58) Field of Classification Search
CPC ............. H04W 52/242; H04W 52/243; H04W 52/367; H04W 52/383; H04W 76/14; H04W 84/12; H04B 17/318; H04B 17/336
USPC ........................................................ 455/522
See application file for complete search history.

(56) References Cited

U.S. PATENT DOCUMENTS

| 2017/0086206 | A1* | 3/2017 | Wang | H04W 72/085 |
| 2018/0324596 | A1* | 11/2018 | Xiang | H04W 72/046 |
| 2018/0343096 | A1* | 11/2018 | Kim | H04W 16/28 |
| 2019/0230703 | A1* | 7/2019 | Lv | H04W 52/246 |
| 2020/0077273 | A1* | 3/2020 | Cherian | H04W 74/06 |
| 2020/0145930 | A1* | 5/2020 | Park | H04W 76/14 |

* cited by examiner

*Primary Examiner* — Philip Sobutka
(74) *Attorney, Agent, or Firm* — Schwabe, Williamson & Wyatt, P.C.

(57) ABSTRACT

Among other things, embodiments of the present disclosure help provide stable wideband transmissions through interference. Other embodiments may be described and claimed.

19 Claims, 8 Drawing Sheets

DETERMINING WIDEBAND TRANSMISSION POWER BASED ON INTERFERENCE AND PREAMBLE DETECTION LEVELS FOR AN OVERLAPPING BASIC SERVICE SET

FIELD

Embodiments of the present invention relate generally to the technical field of wireless communications.

BACKGROUND

The Institute of Electrical and Electronics Engineers (IEEE) is developing specifications for enhancements to high efficiency (HE) wireless local area networks (WLAN). See, e.g., IEEE 802.11ac-2013—IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz (hereinafter "IEEE 802.11ac"). See also IEEE 802.11ax D4.0, February 2019—IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN (hereinafter "IEEE 802.11ax"). Collectively, these specifications may be referred to herein as "802.11ac/ax." 802.11ac/ax provides for an extremely high data rate by 80 or 160 MHz wideband transmissions, and potentially 320 MHz in extremely high throughput (EHT) defined in next generation 802.11 specifications. In reality, however, in the unlicensed spectrum a wireless station (STA) has to defer to other on-going narrowband (20 or 40 MHz) transmissions and it is often difficult to get an idle 80/160/320 MHz bandwidth to maintain a high throughput link between stations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details.

In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

As noted above, despite the high data rates provided by the 802.11ac/ax specifications, in reality a STA has to defer to other on-going narrowband (20 or 40 MHz) transmissions and, therefore, it may be difficult to use an idle 80/160/320 MHz bandwidth to maintain a high throughput link between stations. For example, the STA may have to defer to signals of −82 dBm or higher in a primary 20 MHz channel, and defer to signals −72 dBm or higher in the secondary channels. Additionally, if a preamble is not detected (or non-802.11 signal detected) the STA may have to defer to signals of −62 dBm or higher.

802.11ax developed a spatial reuse scheme that can adjust the OBSS preamble detection level (OBSS_PDlevel) based on the transmit power (TX_PWR) of a STA in the following equation, where: TX_PWRref=21 dBm (non-AP STA), OBSS_PDmax=−62 dBm, and OBSS_PDmin=−82 dBm. This allows a STA to transmit even if the signal received from an OBSS is higher than −82 dBm but below −62 dBm.

OBSS_PDlevel⇐max (OBSS_PDmin, min (OBSS_PDmax, OBSS_PDmin+(TX_PWRref−TXPWR)))

Figure 1:
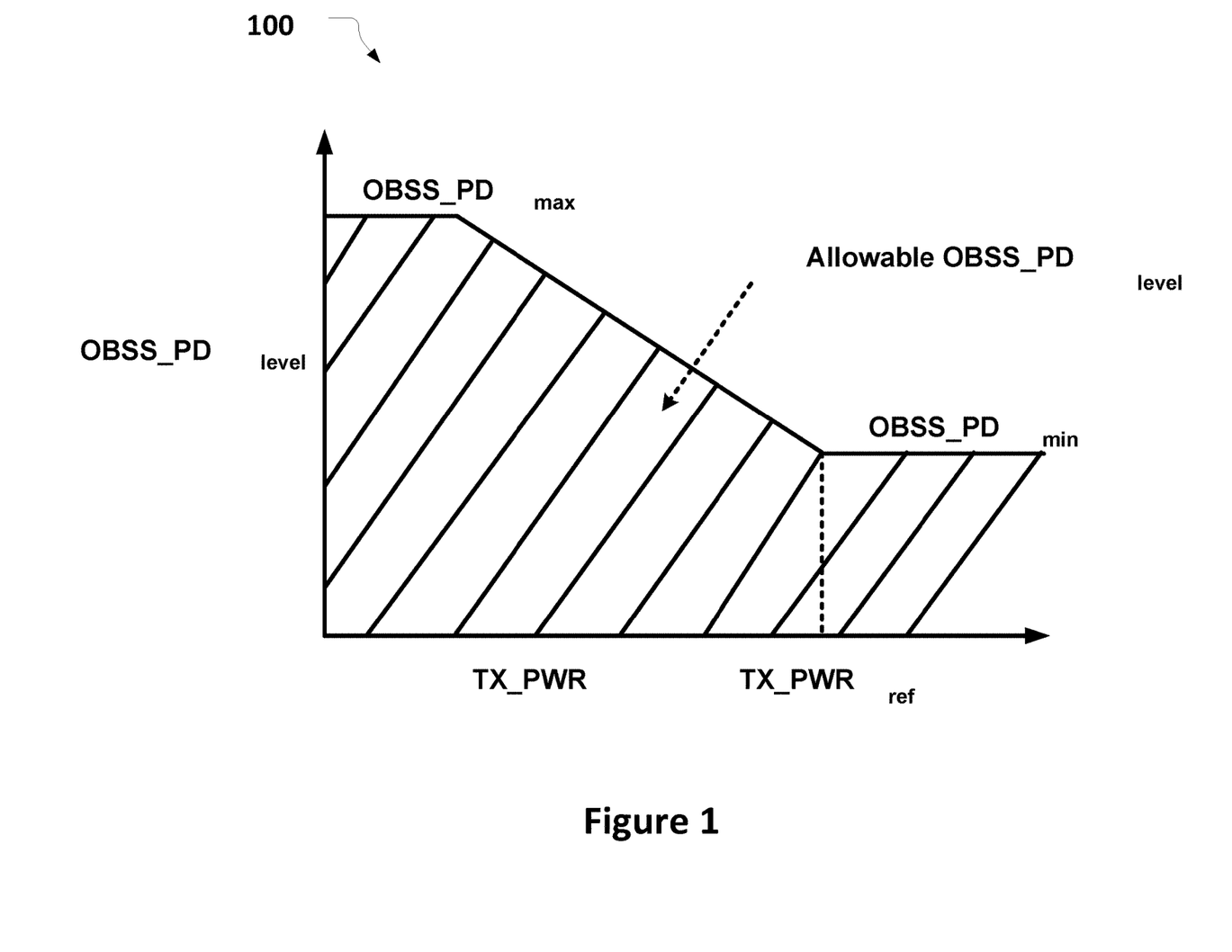
FIG. 1 illustrates an example of overlapping basic service set (OBSS) preamble detection and transmission power in accordance with some embodiments.

FIG. 1 illustrates the relationship between, and adjustment rules for, TX_PWR and OBSS_PDlevel in accordance with some embodiments. The OBSS_PDlevel can be increased by maximum 20 dB to −62 dBm from the original −82 dBm when the transmit power (TX_PWR) of a STA is reduced to 1 dBm as follows: when TX_PWR is 1 dBm, OBSS_PDlevel⇐max(−82, min(−62, −82+(21−1)))=−62 dBm. This gives a STA more chance to transmit even if there is another OBSS transmission as long as the OBSS signal's power is lower than −62 dBm.

However, for the case where the TX_PWR is reduced to a much lower value (e.g., −10 dBm) the OBSS_PDlevel cannot be increased beyond −62 dBm because two STAs are very close to each other and can still maintain a high enough SNR to close the link, and the STA still needs to defer to the signal larger than −62 dBm. This may limit spatial reuse opportunities.

Figure 2:
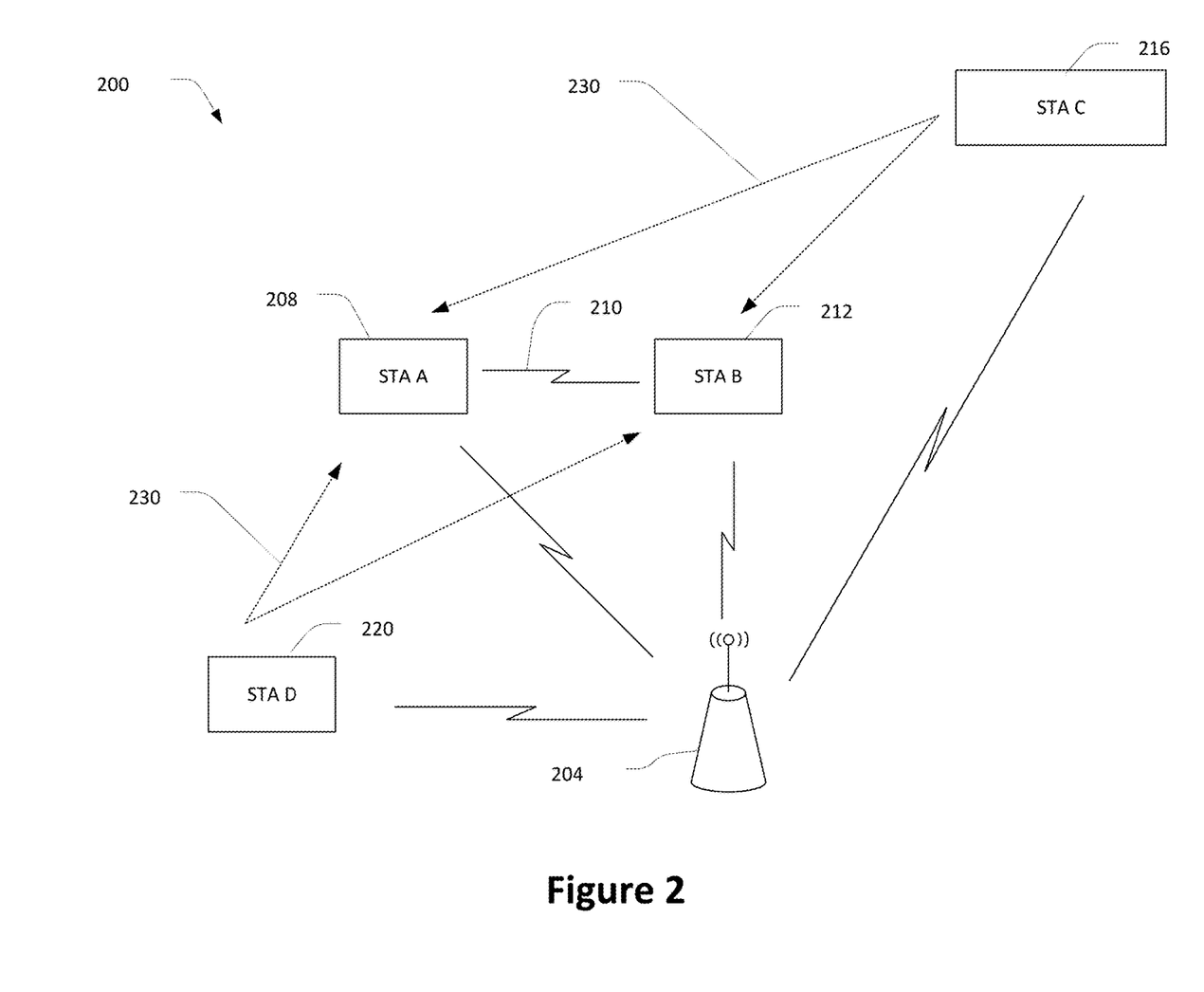
FIG. 2 illustrates an example of a network in accordance with some embodiments.

FIG. 2 includes a network 200 that illustrates the scenario described above in accordance with some embodiments. One particular usage scenario, for example, may include a first STA 208 (e.g., a phone) next to a second STA 212 (e.g., a laptop) and syncing a large file (e.g., a 4K movie, backup, etc.). In the example of the network 200 depicted in FIG. 2, the network 200 includes an AP 204 communicatively coupled with a plurality of stations (STAs) including, for example, STA A 208, STA B 212, STA C 216, and STA D 220. The STAs 208, 212, 216, and 220 may be implemented using a variety of hardware and software components such as, for example, the components depicted for system 700 illustrated in FIG. 7.

The network 200 may be a wireless local area network (WLAN) that is compatible with IEEE 802.11 protocols. In some embodiments, the network 200 may also be referred to as a basic service set (BSS). In some embodiments, the AP 204 and STAs may communicate based on high-efficiency wireless (HEW) protocols defined in, for example, IEEE 802.11ax. STAs operating based on high-efficiency (HEW) protocols may also be referred to as HEW or high-efficiency (HE) STAs.

FIG. 2 illustrates a peer-to-peer use case where the first STA 208 and second STA 212 (e.g., smartphone and laptop) are in close proximity to each other (e.g., less than fifty centimeters apart). In such a situation, conventional systems may not be able to maintain stable wideband link 210 due to interference 230 larger than −62 dBm from other STAs (STA C 216 and STA D 220 in this example).

In embodiments of the present disclosure, by contrast, a STA may transmit at extremely low transmit power (e.g., −10 dBm) so that it can transmit at 80, 160, or 320 MHz bandwidth consistently to a closely located STA even when there is another transmission with the received power at the STA larger than −62 dBm. Since the transmit power is relatively low (e.g., −10 dBm), the interference to the on-going transmission is negligible and since the STAs are very close to each other (e.g., a phone sitting less than 50 cm from a laptop), they can still maintain a high enough signal-plus-interference-to-noise ratio (SINR) even with this low transmit power and interference higher than −62 dBm.

In this manner, embodiments of the present disclosure can establish a stable high throughput wireless link between two STAs at close range (e.g., 50 cm or less) that can transmit a 80/160/320 MHz bandwidth signal consistently during the communication and provide a stable high throughput wireless link in a dense environment. Embodiments of the present disclosure can thus not only help mitigate interference with much higher Rx signal power (e.g., SINR>10-20 dB) with distances less than half a meter, but also help to reduce interference to others with much lower Tx power (e.g., −10 dBm).

In accordance with some embodiments, a first STA 208 (also referred to herein as the "source STA") may establish a peer-to-peer link 210 to a second STA 212 (also referred to herein as the "destination STA") for a file transfer or other communications. The source STA estimates the received power (RX_PWR_destination) at the destination STA using the reference transmit power (TX_PWR_reference) which may, for example, be between 15 dBm and 20 dBm. The source STA then calculates the path-loss (in dB) between the two STAs as: PATH_LOSS=TX_PWR_reference−RX_PWR_destination.

The source STA estimates the received interference power (RX_PWR_interference) from OBSS STAs over 80, 160, or 320 MHz bandwidth channels in the 5 or 6 GHz bands. The RX_PWR_interference may be estimated by finding the maximum of the measured interference power values.

The source STA calculates the minimum Tx power (TX_PWR_min) that can satisfy the target received SINR at the destination STA, taking into account the estimated RX_PWR_interference over 80, 160, or 320 MHz bandwidth according to: RX_SINR_target=TX_PWR_min−PATH_LOSS−RX_PWR_interference−NOISE_PWR.

The source STA determines the OBSS_PD_level using the same equation described above with reference to FIG. 1, except the OBSS_PDmax is increased to a value larger than −62 dBm. For example, OBSS_PDmax may be se to −50 dBm, TX_PWRref=21 dBm (non-AP STA), OBSS_PDmax=−50 dBm, and OBSS_PDmin=−82 dBm.

If an OBSS signal received in an 80/160/320 MHz bandwidth channel is lower than the OBSS_PD_level, the STA may transmit a wideband signal over an 80/160/320 MHz bandwidth channel to the destination STA at the TX_PWR_min. Since the OBSS_PDmax is increased by more than 10 dB, there is a greater chance for the STA to transmit the wideband signal even if there is an OBSS signal, thus helping enable more consistent wideband transmission at 80/160/320 MHz and supporting a stable >1 Gbps wireless link in a dense environment. This also allows lower latency than conventional Wi-Fi systems.

While the two STAs 208, 210 are communicating over the link 210 using the 80/160/320 MHz bandwidth channels in 5/6 GHz bands, their respective connections to their associated AP 204 may be established in the 2.4 GHz band for concurrent operation during the peer-to-peer communications.

Figure 3:
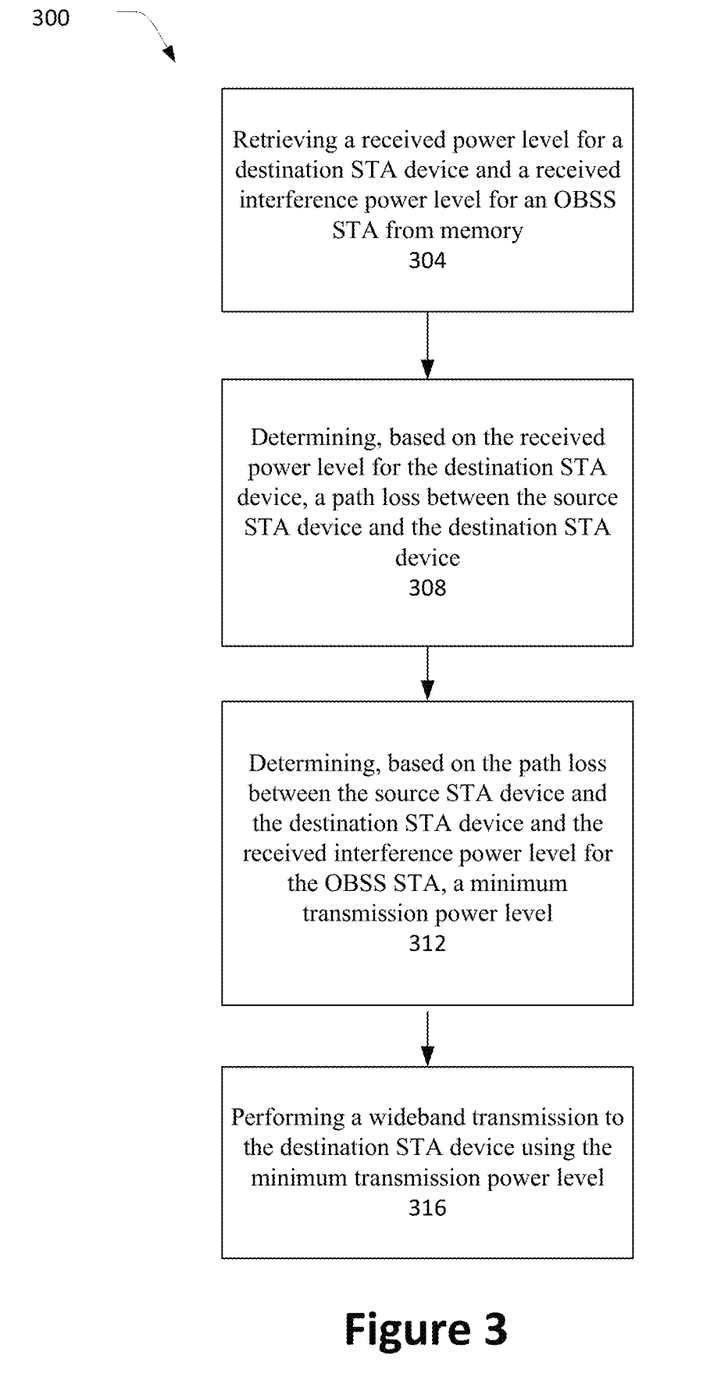
FIG. 3 illustrates an operation flow/algorithmic structure in accordance with some embodiments.

FIG. 3 illustrates an operation flow/algorithmic structure 300 in accordance with some embodiments. The operation flow/algorithmic structure 300 may be implemented by a STA (such as STA 208 in FIG. 2), or components thereof. In some embodiments, for example, the source STA device may be implemented using the system 700 depicted in FIG. 7.

Figure 7:
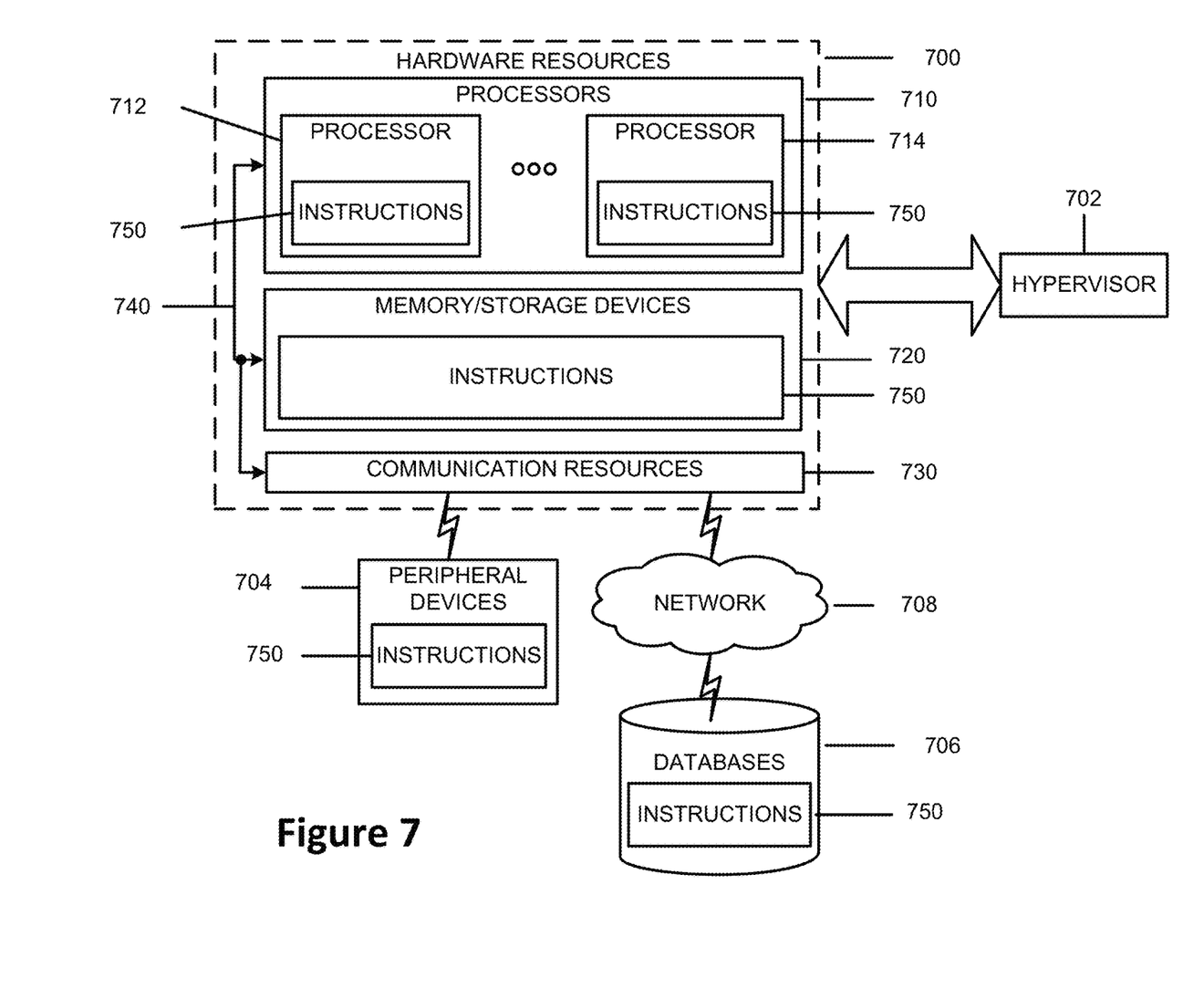
FIG. 7 is a block diagram illustrating components, according to some embodiments, able to read instructions from a machine-readable or computer-readable medium (for example, a non-transitory machine-readable storage medium) and perform any one or more of the methodologies discussed herein.

At 304, the operation flow/algorithmic structure 300 may include retrieving a received power level for a destination STA device and a received interference power level for an OBSS STA from memory (e.g., memory 720 in FIG. 7). In some embodiments, for example, the source STA device may estimate the received power level for the destination STA using the reference transmit power level (e.g., between 15 dBm and 20 dBm) for the source STA device and store the received power level in the memory. Similarly, the source STA device may estimate the received interference power level for the OBSS STA based on (for example) finding a maximum value of measured interference power levels from among a plurality of OBSS STAs.

At 308, the operation flow/algorithmic structure 300 may further include determining, based on the received power level for the destination STA device, a path loss between the source STA device and the destination STA device.

At 312, the operation flow/algorithmic structure 300 may further include determining, based on the path loss between the source STA device and the destination STA device and the received interference power level for the OBSS STA, a minimum transmission power level. In some embodiments, the minimum transmission power level may be determined based on a target received signal-to-interference-plus-noise ratio (SINR) for the destination STA device. For example, the minimum transmission power level may be a power level that, if used by the source STA device for a transmission, may result in the destination STA device receiving the transmission with the target received SINR. In some embodiments, a statistical probability may be used in determining the minimum transmission power level. For example, in some embodiments, a minimum transmission power level may be a power level that, if used by the source STA device for a transmission, may result in the destination STA device receiving the transmission with the target received SINR a predetermined percentage of the time.

At 316, the operation flow/algorithmic structure 300 may further include performing a wideband transmission to the destination STA device using the minimum transmission power level. In some embodiments, the source STA device may establish a peer-to-peer link with the destination STA device prior to performing the wideband transmission. In some embodiments, the wideband transmission is in a 5 GHz frequency band or a 6 GHz frequency band. In some embodiments, the wideband transmission is in an 80 MHz channel, a 160 MHz channel, or a 320 MHz channel of the 5 GHz or 6 GHz frequency band. In some embodiments, the source STA device may communicate with an access point (AP) in a 2.4 GHz frequency band during the wideband transmission.

In some embodiments, the performing of the wideband transmission at 316 may be done based on a comparison of an OBSS preamble detection level (OBSS_PDlevel) to an allowable OBSS preamble detection level (OBSS_PDlevel). The OBSS_PDlevel may correspond to or be based on the received interference power level and the allowable OBSS_PDlevel may be based on the minimum transmission power level. For example, the source STA device may determine the allowable OBSS preamble detection level (OBSS_PDlevel) based on a maximum OBSS preamble detection level, a minimum OBSS preamble detection level, and the minimum transmission power level. The source STA device may further determine the OBSS preamble detection level (OBSS_PDlevel) of the OBSS signal from the OBSS STA, and perform the wideband transmission in response to a determination that the OBSS_PDlevel of the OBSS signal is less than or equal to the allowable OBSS_PDlevel. In some embodiments, the maximum OBSS preamble detection level (OBSS_PDmax) is higher than −62 dBm.

Figure 4:
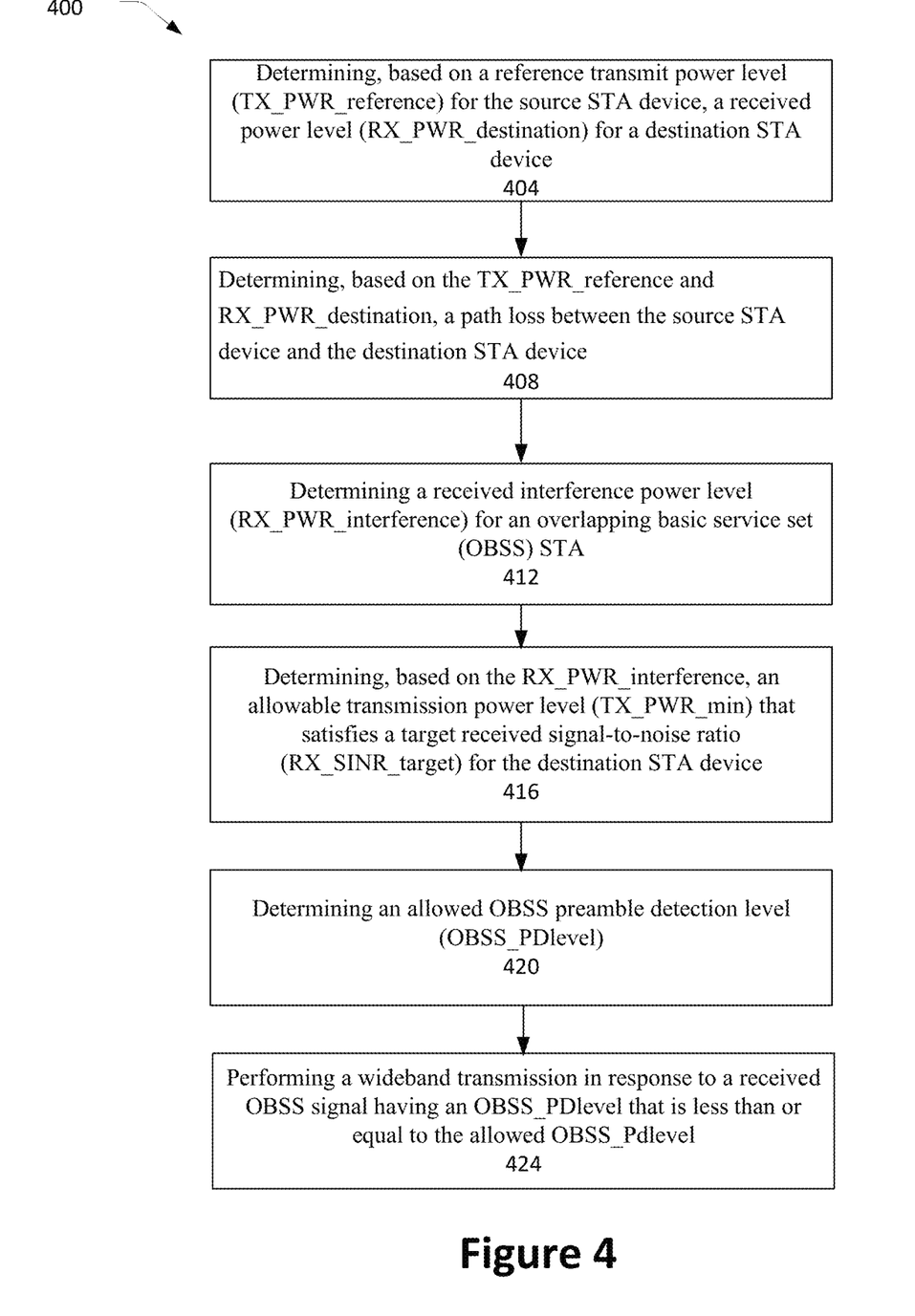
FIG. 4 illustrates an operation flow/algorithmic structure in accordance with some embodiments.

FIG. 4 illustrates an operation flow/algorithmic structure 400 in accordance with some embodiments. The operation flow/algorithmic structure 400 may be implemented by a source device STA (such as STA 208 in FIG. 2), or components thereof. In some embodiments, for example, the source STA device may be implemented using the system 700 depicted in FIG. 7.

At 404, the operation flow/algorithmic structure 400 may include determining, based on a reference transmit power level (TX_PWR_reference) for the source STA device, a received power level (RX_PWR_destination) for a destination STA device.

At 408, the operation flow/algorithmic structure 400 may further include determining, based on the TX_PWR_reference and RX_PWR_destination, a path loss between the source STA device and the destination STA device.

At 412, the operation flow/algorithmic structure 400 may further include determining a received interference power level (RX_PWR_interference) for an overlapping basic service set (OBSS) STA. In some embodiments, the source STA device may determine a respective received interference power level for each respective OBSS STA from a plurality of OBSS STAs (such as STAs 216 and 220 in FIG. 2). The source STA device may determine the RX_PWR_interference based on a maximum received interference power level from the plurality of interference power levels for the plurality of OBSS STAs. In some embodiments, the plurality of OBSS STAs communicate in a 5 GHz frequency band or a 6 GHz frequency band, and in an 80 MHz channel, a 160 MHz channel, or a 320 MHz channel of such a band.

At 416, the operation flow/algorithmic structure 400 may further include determining, based on the RX_PWR_interference, an allowable transmission power level (TX_PWR_min) that satisfies a target received signal-to-noise ratio (RX_SINR_target) for the destination STA device.

At 420, the operation flow/algorithmic structure 400 may further include determining an allowed OBSS preamble detection level (OBSS_PDlevel).

At 424, the operation flow/algorithmic structure 400 may further include performing a wideband transmission in response to a received OBSS signal having an OBSS_PDlevel that is less than or equal to the allowed OBSS_Pdlevel.

Figure 5:
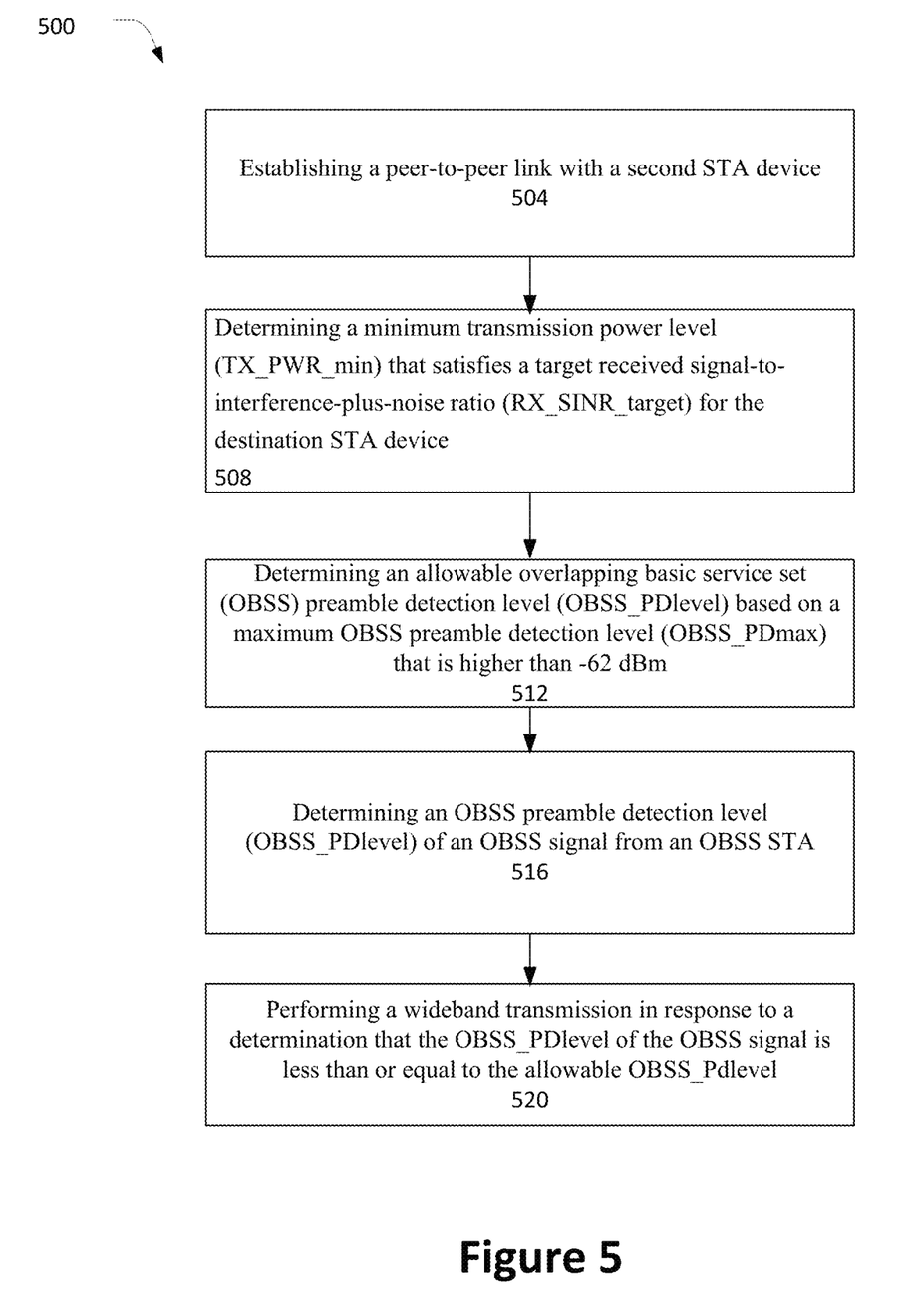
FIG. 5 illustrates an operation flow/algorithmic structure in accordance with some embodiments.

FIG. 5 illustrates an operation flow/algorithmic structure 500 in accordance with some embodiments. The operation flow/algorithmic structure 500 may be implemented by a first STA (such as STA 208 in FIG. 2) or components thereof. In some embodiments, for example, the first STA device may be implemented using the system 700 depicted in FIG. 7.

At 504, the operation flow/algorithmic structure 500 may include establishing a peer-to-peer link with a second STA device.

At 508, the operation flow/algorithmic structure 500 may further include determining a minimum transmission power level (TX_PWR_min) that satisfies a target received signal-to-interference-plus-noise ratio (RX_SINR_target) for the second STA device. In some embodiments, the first STA device may determine: based on a reference transmit power level (TX_PWR_reference) for the first STA device, a received power level (RX_PWR_destination) for the second STA device; based on the TX_PWR_reference and RX_PWR_destination, a path loss between the first STA device and the second STA device; and a received interference power level (RX_PWR_interference) for an OBSS STA. The TX_PWR_min may in turn be determined based on the RX_PWR_interference.

In some embodiments, the first STA device may determine a respective received interference power level for each respective OBSS STA from a plurality of OBSS STAs, and determine the RX_PWR_interference based on a maximum received interference power level from the plurality of interference power levels for the plurality of OBSS STAs.

At 512, the operation flow/algorithmic structure 500 may further include determining an allowable overlapping basic service set (OBSS) preamble detection level (OBSS_PDlevel) based on a maximum OBSS preamble detection level (OBSS_PDmax) that is higher than −62 dBm.

At 516, the operation flow/algorithmic structure 500 may further include determining an OBSS preamble detection level (OBSS_PDlevel) of an OBSS signal from an OBSS STA.

At 520, the operation flow/algorithmic structure 500 may further include performing a wideband transmission in response to a determination that the OBSS_PDlevel of the OBSS signal is less than or equal to the allowable OBSS_Pdlevel. In some embodiments, the wideband transmission is in one of the following of a 6 GHz frequency band or a 5 GHz frequency band: an 80 MHz channel, a 160 MHz channel, or a 320 MHz channel. In some embodiments, the first STA device may communicate with an access point (such as AP 204 in FIG. 2) in a 2.4 GHz frequency band during the wideband transmission.

Figure 6:
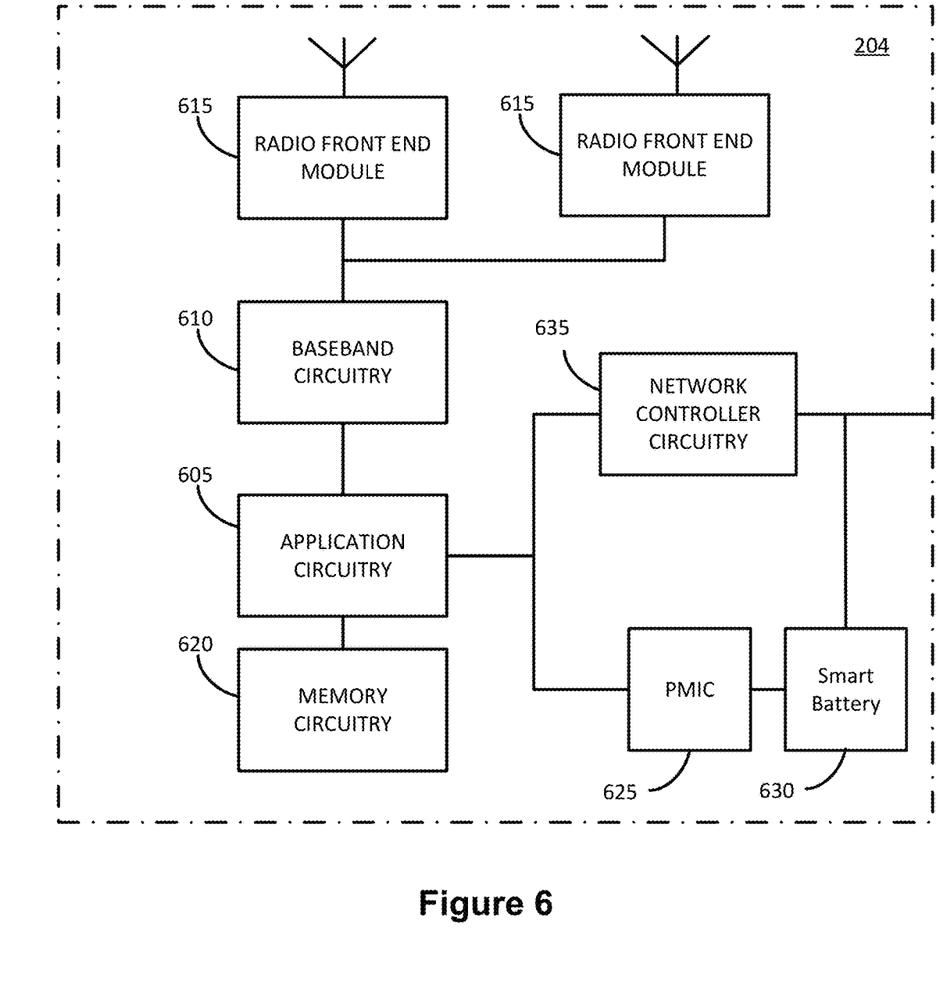
FIG. 6 illustrates an example of an access point in accordance with various embodiments.

FIG. 6 illustrates an example of the AP 204 in accordance with various embodiments. The AP 604 may include one or more of application circuitry 605, baseband circuitry 610, one or more radio front end modules 615, memory circuitry 620, power management integrated circuitry (PMIC) 625, and network controller circuitry 635.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 605 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (110 or 10), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 605 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the AP 204 may not utilize application circuitry 605, and instead may include a special-purpose processor/controller to process IP data received from an EPC or 7GC, for example.

Additionally or alternatively, application circuitry 605 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry (for example, signal processing circuitry 600) with one or more instances of control circuitry (not shown) to provide control functions for the digital baseband circuitry and/or radio frequency circuitry (e.g., the radio front end modules 615).

The radio front end modules (RFEM) 615 may include radio frequency integrated circuits (RFICs), amplifiers (for example, power amplifiers and low-noise amplifiers), and antenna elements to effectuate over-the-air transmissions. The RFEM 615 may include beamforming circuitry to increase transmission/reception directivity.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the access point 204 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The components shown by FIG. 6 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

FIG. 7 is a block diagram illustrating components, according to some embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 702 may be executed to provide an execution environment for one or more network slices/sub-slices to utilize the hardware resources 700. A "virtualized resource" may refer to compute, storage, and/or network resources provided by virtualization infrastructure to an application, device, system, etc.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 750 may comprise software, a program, an application, an applet, an app, or other executable code for causing at least any of the processors 710 to perform any one or more of the methodologies discussed herein. For example, the instructions 750 may cause one or more of the processors 710 to determine individual transmit power allocations and MCSs for a multiuser OFDM a downlink transmission as described herein.

The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
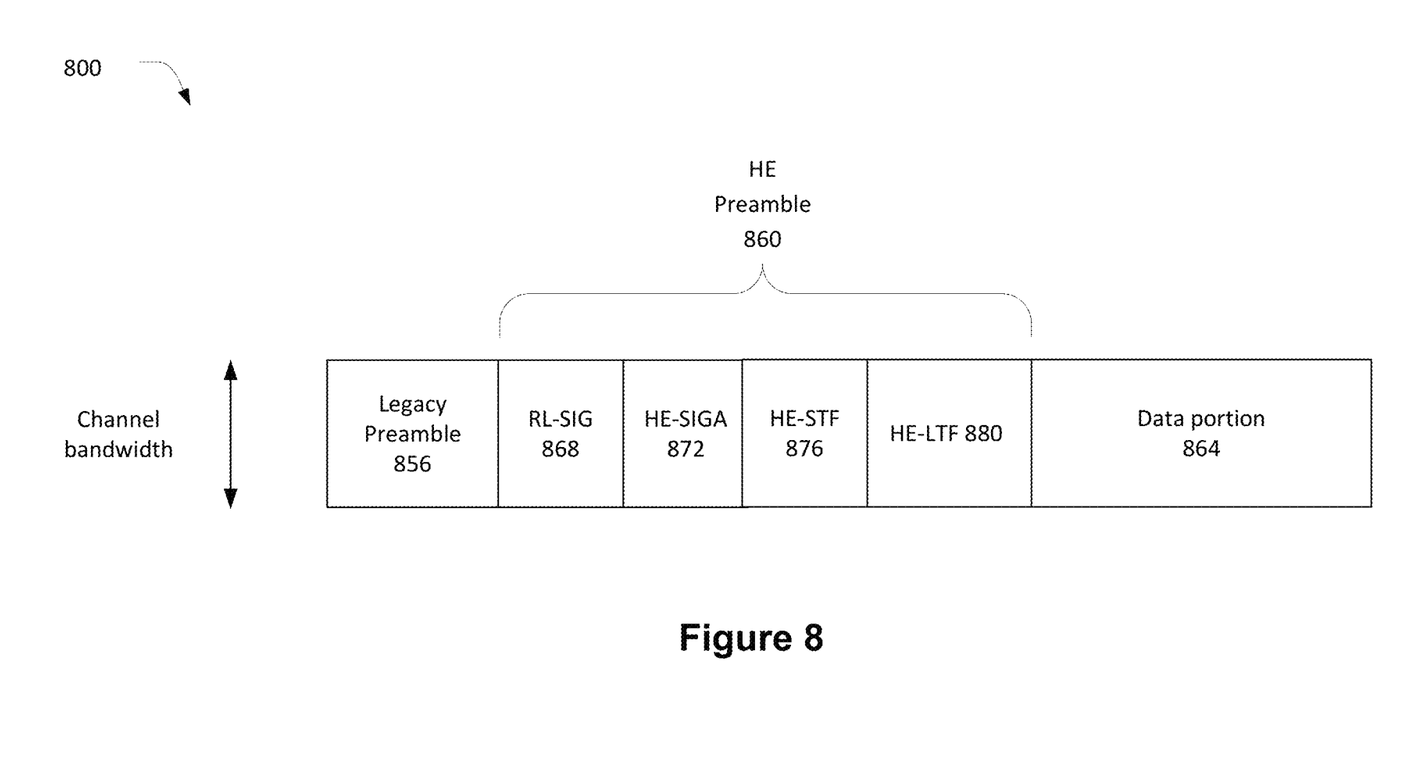
FIG. 8 illustrates a multi-user packet according to some embodiments.

FIG. 8 illustrates an example of a packet 800 that may be generated by an OBSS STA and transmitted in an uplink transmission. The fields of the packet 800 may be used to determine the OBSS preamble levels described above. The packet 800 may include a legacy preamble 856, a HE preamble 860, and a data portion 864. The HE preamble 860 may include an RL-SIG 868, HE-SIG A 872, HE-STF 876, and HE-LTF 880. The RL-SIG 868 may facilitate detection by providing repetition/L-SIG validity checks. The HE-SIG-A 872 may include common transmission parameters for the users having data within the data portion 812 of the multiuser packet 800. In some embodiments, the HE-SIG-A 872 may provide information regarding MCSs, bandwidth, number of spatial streams, and other parameter information to allow a receiver to correctly decode the multiuser packet 800. The HE-SIG-A 872 may provide information regarding a network color, remaining TxOP duration, whether the frame is UL or DL, etc. The HE-STF 876 and HE-LTF 880 may be used for tuning the transmitter/receiver for MIMO transmissions. The HE-STF 876 may be used to improve automatic gain control estimation in a MIMO transmission, and the HE-LTF 880 may allow a receiver to estimate the MIMO channel between a set of constellation mapper outputs and the receive chains. The data portion 864 may include acknowledgment information or uplink data.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes an apparatus of a source station (STA) device, the apparatus comprising: memory to store: a received power level for a destination STA device; and a received interference power level for an overlapping basic service set (OBSS) STA; and processing circuitry, coupled with the memory, to: retrieve the received power level for the destination STA device and the received interference power level for the OBSS STA from the memory; determine, based on the received power level for the destination STA device, a path loss between the source STA device and the destination STA device; determine, based on the path loss between the source STA device and the destination STA device and the received interference power level for the OBSS STA, a minimum transmission power level; and perform a wideband transmission to the destination STA device using the minimum transmission power level.

Example 2 includes the apparatus of example 1 or some other example herein, wherein the processing circuitry is further to determine the minimum transmission power level based on a target received signal-to-interference-plus-noise ratio (SINR) for the destination STA device.

Example 3 includes the apparatus of example 1 or some other example herein, wherein the processing circuitry is further to establish a peer-to-peer link with the destination STA device prior to performing the wideband transmission.

Example 4 includes the apparatus of example 1 or some other example herein, wherein the processing circuitry is further to: determine an allowable OBSS preamble detection level (OBSS_PDlevel) based on a maximum OBSS preamble detection level, a minimum OBSS preamble detection level, and the minimum transmission power level; determine an OBSS preamble detection level (OBSS_PDlevel) of an OBSS signal from the OBSS STA; and perform the wideband transmission in response to a determination that the OBSS_PDlevel of the OBSS signal is less than or equal to the allowable OBSS_PDlevel.

Example 5 includes the apparatus of example 4 or some other example herein, wherein the maximum OBSS preamble detection level (OBSS_PDmax) is higher than −62 dBm.

Example 6 includes the apparatus of example 1 or some other example herein, wherein the wideband transmission is in a 5 GHz frequency band or a 6 GHz frequency band.

Example 7 includes the apparatus of example 6 or some other example herein, wherein the wideband transmission is in an 80 MHz channel, a 160 MHz channel, or a 320 MHz channel.

Example 8 includes the apparatus of example 1 or some other example herein, wherein the processing circuitry is further to communicate with an access point (AP) in a 2.4 GHz frequency band during the wideband transmission.

Example 9 includes one or more non-transitory, computer-readable media storing instructions that, when executed by one or more processors, cause a source station (STA) device to: determine, based on a reference transmit power level (TX_PWR_reference) for the source STA device, a received power level (RX_PWR_destination) for a destination STA device; determine, based on the TX_PWR_reference and RX_PWR_destination, a path loss between the source STA device and the destination STA device; determine a received interference power level (RX_PWR_interference) for an overlapping basic service set (OBSS) STA; determine, based on the RX_PWR_interference, an allowable transmission power level (TX_PWR_min) that satisfies a target received signal-to-noise ratio (RX_SINR_target) for the destination STA device; determine an allowed OBSS preamble detection level (OBSS_PDlevel); and perform a wideband transmission in response to a received OBSS signal having an OBSS_PDlevel that is less than or equal to the allowed OBSS_PDlevel.

Example 10 includes the one or more non-transitory, computer-readable media of example 9 or some other example herein, wherein the media further stores instructions to cause the source STA device to determine a respective received interference power level for each respective OBSS STA from a plurality of OBSS STAs.

Example 11 includes the one or more non-transitory, computer-readable media of example 10 or some other example herein, wherein the media further stores instructions to cause the source STA device to determine the RX_PWR_interference based on a maximum received interference power level from the plurality of interference power levels for the plurality of OBSS STAs.

Example 12 includes the one or more non-transitory, computer-readable media of example 10 or some other example herein, wherein the plurality of OBSS STAs communicate in a 5 GHz frequency band or a 6 GHz frequency band.

Example 13 includes the one or more non-transitory, computer-readable media of example 12 or some other example herein, wherein the plurality of OBSS STAs communicate in an 80 MHz channel, a 160 MHz channel, or a 320 MHz channel.

Example 14 includes one or more non-transitory, computer-readable media storing instructions that, when executed by one or more processors, cause a first station (STA) device to: establish a peer-to-peer link with a second STA device; determine a minimum transmission power level (TX_PWR_min) that satisfies a target received signal-to-interference-plus-noise ratio (RX_SINR_target) for the second STA device; determine an allowable overlapping basic service set (OBSS) preamble detection level (OBSS_PDlevel) based on a maximum OBSS preamble detection level (OBSS_PDmax) that is higher than −62 dBm; determine an OBSS preamble detection level (OBSS_PDlevel) of an OBSS signal from an OBSS STA; and perform a wideband transmission in response to a determination that the OBSS_PDlevel of the OBSS signal is less than or equal to the allowable OBSS_PDlevel.

Example 15 includes the one or more non-transitory, computer-readable media of example 14 or some other example herein, wherein the media further stores instructions for causing the first STA device to: determine, based on a reference transmit power level (TX_PWR_reference) for the first STA device, a received power level (RX_PWR_destination) for the second STA device; determine, based on the TX_PWR_reference and RX_PWR_destination, a path loss between the first STA device and the second STA device; and determine a received interference power level (RX_PWR_interference) for an OBSS STA.

Example 16 includes the one or more non-transitory, computer-readable media of example 15 or some other example herein, wherein the TX_PWR_min is determined based on the RX_PWR_interference.

Example 17 includes the one or more non-transitory, computer-readable media of example 14 or some other example herein, wherein the media further stores instructions to cause the first STA device to determine a respective received interference power level for each respective OBSS STA from a plurality of OBSS STAs.

Example 18 includes the one or more non-transitory, computer-readable media of example 17 or some other example herein, wherein the media further stores instructions to cause the first STA device to determine the RX_P-

WR_interference based on a maximum received interference power level from the plurality of interference power levels for the plurality of OBSS STAs.

Example 19 includes the one or more non-transitory, computer-readable media of example 14 or some other example herein, wherein the wideband transmission is in one of the following of a 6 GHz frequency band or a 5 GHz frequency band: an 80 MHz channel, a 160 MHz channel, or a 320 MHz channel.

Example 20 includes the one or more non-transitory, computer-readable media of example 14 or some other example herein, wherein the media further stores instructions to cause the first STA device to communicate with an access point (AP) in a 2.4 GHz frequency band during the wideband transmission.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus of a source station (STA) device, the apparatus comprising:
    memory to store:
        a received power level for a destination STA device; and
        a received interference power level for an overlapping basic service set (OBSS) STA; and
    processing circuitry, coupled with the memory, to:
        retrieve the received power level for the destination STA device and the received interference power level for the OBSS STA from the memory;
        determine, based on the received power level for the destination STA device, a path loss between the source STA device and the destination STA device;
        determine, based on the path loss between the source STA device and the destination STA device and the received interference power level for the OBSS STA, a minimum transmission power level;
        perform a wideband transmission to the destination STA device using the minimum transmission power level;
        determine an allowable OBSS preamble detection level (OBSS_PDlevel) based on a maximum OBSS preamble detection level, a minimum OBSS preamble detection level, and the minimum transmission power level;
        determine an OBSS preamble detection level (OBSS_PDlevel) of an OBSS signal from the OBSS STA; and
        perform the wideband transmission in response to a determination that the OBSS_PDlevel of the OBSS signal is less than or equal to the allowable OBSS_PDlevel.

2. The apparatus of claim 1, wherein the processing circuitry is further to determine the minimum transmission power level based on a target received signal-to-interference-plus-noise ratio (SINR) for the destination STA device.

3. The apparatus of claim 1, wherein the processing circuitry is further to establish a peer-to-peer link with the destination STA device prior to performing the wideband transmission.

4. The apparatus of claim 1, wherein the maximum OBSS preamble detection level (OBSS_PDmax) is higher than −62 dBm.

5. The apparatus of claim 1, wherein the wideband transmission is in a 5 GHz frequency band or a 6 GHz frequency band.

6. The apparatus of claim 5, wherein the wideband transmission is in an 80 MHz channel, a 160 MHz channel, or a 320 MHz channel.

7. The apparatus of claim 1, wherein the processing circuitry is further to communicate with an access point (AP) in a 2.4 GHz frequency band during the wideband transmission.

8. One or more non-transitory, computer-readable media storing instructions that, when executed by one or more processors, cause a source station (STA) device to:
    determine, based on a reference transmit power level (TX_PWR_reference) for the source STA device, a received power level (RX_PWR_destination) for a destination STA device;
    determine, based on the TX_PWR_reference and RX_PWR_destination, a path loss between the source STA device and the destination STA device;
    determine a received interference power level (RX_PWR_interference) for an overlapping basic service set (OBSS) STA;
    determine, based on the RX_PWR_interference, an allowable transmission power level (TX_PWR_min) that satisfies a target received signal-to-noise ratio (RX_SINR_target) for the destination STA device;
    determine an allowed OBSS preamble detection level (OBSS_PDlevel); and perform a wideband transmission in response to a received OBSS signal having an OBSS_PDlevel that is less than or equal to the allowed OBSS_PDlevel.

9. The one or more non-transitory, computer-readable media of claim 8, wherein the media further stores instructions to cause the source STA device to determine a respective received interference power level for each respective OBSS STA from a plurality of OBSS STAs.

10. The one or more non-transitory, computer-readable media of claim 9, wherein the media further stores instructions to cause the source STA device to determine the RX_PWR_interference based on a maximum received interference power level from a plurality of interference power levels for the plurality of OBSS STAs.

11. The one or more non-transitory, computer-readable media of claim 9, wherein the plurality of OBSS STAs communicate in a 5 GHz frequency band or a 6 GHz frequency band.

12. The one or more non-transitory, computer-readable media of claim 11, wherein the plurality of OBSS STAs communicate in an 80 MHz channel, a 160 MHz channel, or a 320 MHz channel.

13. One or more non-transitory, computer-readable media storing instructions that, when executed by one or more processors, cause a first station (STA) device to:
establish a peer-to-peer link with a second STA device;
determine a minimum transmission power level (TX_PWR_min) that satisfies a target received signal-to-interference-plus-noise ratio (RX_SINR_target) for the second STA device;
determine an allowable overlapping basic service set (OBSS) preamble detection level (OBSS_PDlevel) based on a maximum OBSS preamble detection level (OBSS_PDmax) that is higher than −62 dBm;
determine an OBSS preamble detection level (OBSS_PDlevel) of an OBSS signal from an OBSS STA; and
perform a wideband transmission in response to a determination that the OBSS_PDlevel of the OBSS signal is less than or equal to the allowable OBSS_PDlevel.

14. The one or more non-transitory, computer-readable media of claim 13, wherein the media further stores instructions for causing the first STA device to:
determine, based on a reference transmit power level (TX_PWR_reference) for the first STA device, a received power level (RX_PWR_destination) for the second STA device;
determine, based on the TX_PWR_reference and RX_PWR_destination, a path loss between the first STA device and the second STA device; and
determine a received interference power level (RX_PWR_interference) for an OBSS STA.

15. The one or more non-transitory, computer-readable media of claim 14, wherein the TX_PWR_min is determined based on the RX_PWR_interference.

16. The one or more non-transitory, computer-readable media of claim 14, wherein the media further stores instructions to cause the first STA device to determine a respective received interference power level for each respective OBSS STA from a plurality of OBSS STAs.

17. The one or more non-transitory, computer-readable media of claim 16, wherein the media further stores instructions to cause the first STA device to determine the RX_PWR_interference based on a maximum received interference power level from a plurality of interference power levels for the plurality of OBSS STAs.

18. The one or more non-transitory, computer-readable media of claim 13, wherein the wideband transmission is in one of the following of a 6 GHz frequency band or a 5 GHz frequency band: an 80 MHz channel, a 160 MHz channel, or a 320 MHz channel.

19. The one or more non-transitory, computer-readable media of claim 13, wherein the media further stores instructions to cause the first STA device to communicate with an access point (AP) in a 2.4 GHz frequency band during the wideband transmission.

* * * * *